3,205,175
METHOD OF MAKING ETHYL-CELLULOSE-LINED
LIQUID-CONTAINING MINUTE CAPSULES
Theodore Maierson, Dayton, Ohio, assignor to The National Cash Register Company, Dayton, Ohio, a corporation of Maryland
No Drawing. Filed Mar. 9, 1960, Ser. No. 13,726
2 Claims. (Cl. 252—316)

This invention relates to an ethyl-cellulose-lined liquid-containing minute capsule, and to a method of making such.

The invention more particularly pertains to such a capsule having walls of gelled hydrophilic film-forming polymer material, the interior surface of the walls of such a capsule being lined and plugged with a film deposit of ethyl cellulose which is hydrophobic, the walls and the lining, combined, retaining the liquid, which is water-immiscible.

It is well known that films, or membranes, made of gelable hydrophilic polymeric materials which have become gelled, such as those which compose the capsule walls, are composed of an interlacing network of long molecules which network retains within it, in the resultant channels, or pores, a quantity of water which varies according to the density of the structure. The presence of the water-containing channels, or pores, may under certain conditions pass fluids, such as vapors and liquids, according to the various forces prevailing on either side of the film. In capsules having walls made of such gelled material and holding, locked up by the walls, water-immiscible liquid, these pores may offer an opportunity for the so-contained liquid to escape due to its vapor pressure, or to the presence of liquids on the outside of a capsule which provide the necessary activity to draw out the water-immiscible liquid material, or to both circumstances acting together.

It has been found that, if the interior walls of a capsule are lined with an ethyl cellulose film, the liquid contained in such capsule walls cannot escape, as the ethyl cellulose plugs the pores. Inasmuch as in the manufacture of minute capsules, which are made en masse because they cannot be handled individually, the ethyl cellulose film must be present in a capsule between the liquid material and the capsule wall at the time the capsule wall is formed and gelled, this requires a special process in the manufacture of such capsules, beyond the known processes by which minute capsules not having such lining have been prepared, such known processes being disclosed in the Green et al. and Green United States Letters Patent Nos. 2,800,457 and 2,800,458, respectively, among others. In those patents is disclosed the method of manufacturing such minute unlined liquid-containing capsules en masse in a modified aqueous medium by the introduction of the capsule-forming materials thereinto and subsequently controlling the temperature and pH of the system, with agitation, to form liquid-walled capsules, followed by further steps of gelling and hardening of the polymer wall material by cooling. By the instant invention, the barrier film of ethyl cellulose is provided between the capsule wall and the liquid nucleus of each capsule.

Therefore, it is an object of this invention to provide a minute capsule, of somewhat molecularly porous gelled hydrophilic film-forming polymer material, that contains within its walls a water-immiscible liquid, the capsule being lined on the inner surface of the polymer wall with a film of ethyl cellulose impermeable to water-immiscible liquids because of the natural hydrophobic nature of ethyl cellulose.

The process is applicable to the formation of substantially spherical capsules ranging in size from one to several hundred microns in average diameter, as desired, according to the drop-size of the liquid material used as nuclei of the capsules.

Because of its superior characteristics as a film-forming material, the preferred embodiment of the invention will be described with reference to a complex of gelatin and gum arabic molecules as the ultimate wall-forming materials, and trichlorodiphenyl as the liquid capsule nucleus material, which nucleus material, is a liquid at both manufacturing and room temperatures. The gelatin and the gum arabic are dispersed in hot water, and the water-immiscible liquid droplets are formed by emulsifying the water-immiscible trichlorodiphenyl therein, under certain pH conditions which inhibit the wall-forming materials from forming molecular complexes until the desired drop-size of the water-immiscible liquid is attained. Complex coacervation of the gelatin and gum arabic then is brought about by lowering the pH of the system with agitation, whereupon the complex entities of the gelatin and gum arabic molecules form and separate out of the aqueous medium as gelable minute liquid entities, and deposit as a liquid coating around the individual droplets of trichlorodiphenyl to form a liquid sheath about each. The dispersed liquid-walled capsules thus formed are completed by cooling the system to gel the complex polymer walls to a self-sustaining condition, which gelation step is later followed by the hardening of the walls.

The novel feature of the process is the supplying of the liquid droplet material with the hydrophobic ethyl cellulose which, during the manufacturing operation, precipitates as a solid film at the interface between the liquid capsule nucleus droplets and the deposit of polymer complex wall material, the ethyl cellulose film staying at the interface between the oil drops and the deposited wall material during and after the gelling and hardening operations, and serving as a barrier which effectively plugs the pores that conventionally exist in such walls in more or less profuse abundance according to the rate of gelation, the rate of coacervation, and other factors.

*The preferred embodiment*

An emulsion is made of 20 grams of gum arabic dissolved in 160 grams of water, and 80 grams of trichlorodiphenyl in which is dissolved from 0.2 to 10 grams of low-viscosity ethyl cellulose, said ethyl cellulose having an ethoxyl content of about 47.5 percent, by weight, and viscosity of 4 centipoises when dispersed dry in a 5 percent concentration, by weight, in a 80/20 toluene-ethanol bath at 25 degrees centigrade. This emulsification is continued until the desired drop-size is reached, say —5 microns, all the foregoing procedures being carried out at about 50 degrees centigrade. Before and during the emulsification, the pH of the system should be adjusted to between 6 and 7. To the emulsion is added and stirred in 20 grams of pigskin gelatin dissolved in 150 grams of water, the gelatin preferably having its isoelectric point at about pH 8. Water is added, with agitation of the emulsion system, until the complex coacervation of the polymer molecules is initiated, which point is calculated in absence of any oil by the clouding effect of the solution as described more fully in the mentioned patents. The molecular complex coacervate entities, due to the agitation, cannot settle out by gravity, which they otherwise would do, but instead deposit on the drops of oil individually, giving each a liquid wall of gelable complex polymer. After the complex polymer material has substantially all deposited, the system is poured into a large quantity of water at zero degrees centigrade which is agitated to make the system uniform, which results in the liquid walls' becoming gelled and set to a firm self-supporting condition. Meanwhile, due to the presence of the aqueous phase of the system surrounding the oil droplets, the ethyl cellulose at the interface between each droplet and the surrounding aqueous environment precipitates and forms a film on which the first complex polymer entities deposit, such action continuing during the deposition of the wall material. This ethyl cellulose film effectively acts as an impermeable barrier film which plugs the capsule wall pores and through which the trichlorodiphenyl cannot escape.

Following the gelation of the capsules, they may be hardened by pouring into the system, with continued agitation, 19.8 grams of 37%, by weight, aqueous solution of formaldehyde, with the system adjusted to between pH 9 and pH 11, the agitation being continued for an hour or more at about 3 degrees centigrade. The capsules now are completely formed and may be used in the residual aqueous system or separated therefrom by filtering, centrifuging, spray-drying, and the like.

As substitutes for the trichlorodiphenyl may be mentioned all kinds of animal, vegetable, and mineral oils and modified synthetic oils such as fluorinated hydrocarbons. Among such oils may be mentioned olive oil, coconut oil, castor oil, sperm oil, essential vegetable oils, petroleum lubrication oil and more volatile fractions of petroleum, and synthetic oil such as methyl salicylate.

Among substitutes for the polymer materials may be mentioned albumin, alginates, casein, agar-agar, starch, pectins, and Irish moss, such being selected in pairs so that both negative and amphoteric polymers are used together, and so that at least one is gelable. The negative and amphoteric nature of the paired polymer molecules permits of the formation of coacervate entities under conditions such as those set out in the preferred embodiment.

There is a wide range of ethyl cellulose material to choose from, as regards viscosity, the mentioned viscosity of 4 centipoises, under conditions set out, being particularly adapted to the manufacturing process described, but this may be varied from a lower viscosity up to 10 centipoises, the ethyl cellulose material being selected by its ethoxyl content according to the water-immiscible liquid used, inasmuch as some liquids will have more solvent action on ethyl cellulose of a particular ethoxy content than others.

It will be understood from the preceding specification that the invention relies upon the use of the barrier ethyl cellulose film between the liquid retained in an unruptured capsule and the capsule wall, particularly a film of ethyl cellulose, because it is oil-soluble to a degree, varying with the particular oil, and has the property of precipitating in the presence of an aqueous interface because of its hydrophobic characteristics.

It will be understood that the particular hydrophilic polymer wall material and capsule nucleus oil material set forth in the preferred embodiment are not controlling as regards the novelty of the invention, but the structure of a capsule having a liquid nucleus, surrounded by a barrier film of ethyl cellulose between the nucleus and the capsule wall, is new, as is the described process of making such a capsule, or capsules.

What is claimed is:

1. A process of making minute capsules each having a water-immiscible liquid nucleus retained within a gelled hydrophilic polymer material wall lined with a barrier film of ethyl cellulose, including the steps of providing an aqueous solution of coacervatable and gelable film-forming hydrophilic polymer material; dispersing a liquid solution of the liquid nucleus material and ethyl cellulose therein to the desired drop size; causing coacervation of the polymer material to form liquid coacervate entities, with agitation of the system to cause the formed coacervate entities to be dispersed in the system, which coacervate entities deposit and coalesce on the liquid nucleus drops as liquid walls, the ethyl cellulose at the interface of a nucleus droplet and its deposit of polymer wall material forming a barrier film; and, finally, cooling the system to gel the deposited wall material.

2. The process of claim 1 followed by introducing into the system a hardening agent to harden the deposited wall material.

References Cited by the Examiner

UNITED STATES PATENTS

| | | | |
|---|---|---|---|
| 2,333,283 | 11/43 | Wilson | 167—83 |
| 2,770,571 | 11/56 | Vance et al. | 167—83 |
| 2,800,457 | 7/57 | Green et al. | 252—316 |

JULIUS GREENWALD, *Primary Examiner.*